Nov. 22, 1927.  
E. W. KEMOE ET AL  
1,650,452  
VEHICLE WHEEL  
Filed June 17, 1925  
2 Sheets-Sheet 1
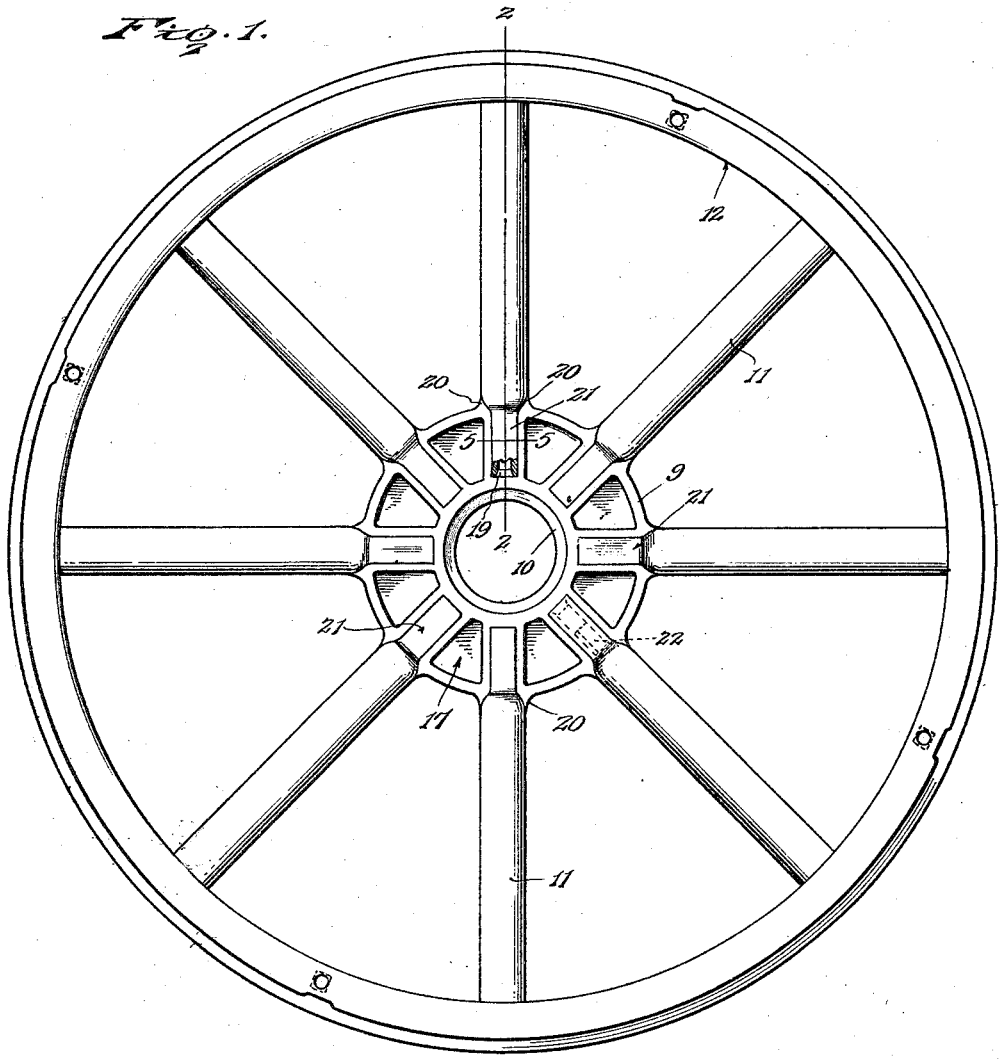
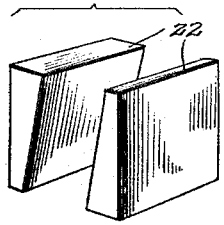
Inventors  
E. W. Kemoe.  
W. G. Price.
By Larry Thacry, Attorneys

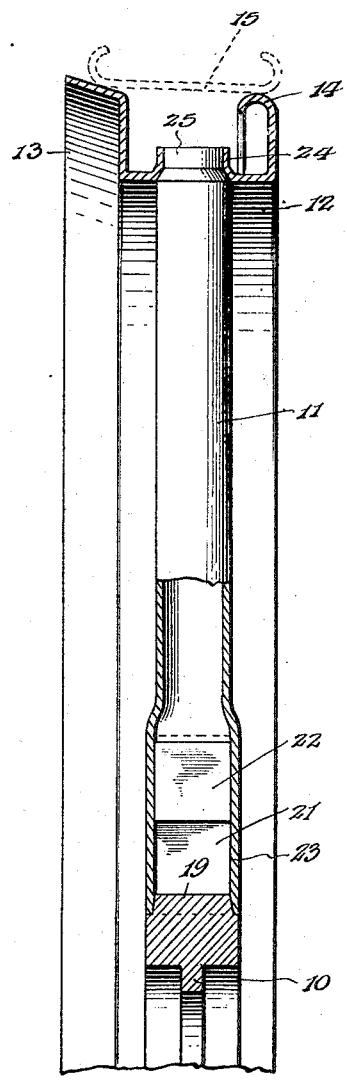
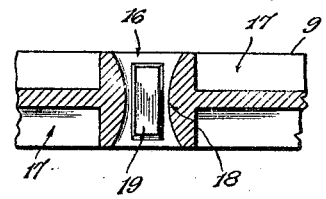
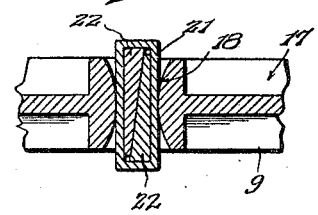
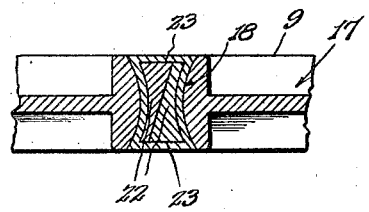

Patented Nov. 22, 1927.

1,650,452

UNITED STATES PATENT OFFICE.

EDWIN W. KEMOE AND WILLIAM G. PRICE, OF SEATTLE, WASHINGTON, ASSIGNORS TO DEAN-MINNICK STEEL WHEEL COMPANY, INC., OF SEATTLE, WASHINGTON, A CORPORATION.

VEHICLE WHEEL.

Application filed June 17, 1925. Serial No. 37,773.

This invention relates to an improved metal vehicle wheel of the general character disclosed in a co-pending application of William G. Price for a similar invention, filed September 23, 1924, Serial No. 739,395.

The invention seeks, among other objects, to provide an all-metal wheel especially adapted for use upon motor vehicles.

A further object of the invention is to provide an improved mounting of the spokes of the wheel and wherein the inner ends of the spokes will be swaged upon the wheel hub.

Another object of the invention, in this connection, is to provide means for centering the inner terminals of the spokes in the slots of the hub and limiting said terminals against displacement incident to the swaging thereof.

The invention seeks, as a further object, to provide means within the inner terminals of the spokes for preventing the collapse of said terminals incident to the swaging thereof, and expanding said terminals tightly against the side walls of the slots of the hub.

And the invention seeks, as a still further object, to provide a construction wherein the spokes will be rigidly and securely connected at their inner ends with the hub and at their outer ends with the felly and will also be locked against transverse movement in the hub slots.

Other and incidental objects will appear hereinafter.

In the accompanying drawings:

Figure 1 is a side elevation of our improved wheel.

Figure 2 is a fragmentary enlarged sectional view on the line 2—2 of Figure 1, looking in the direction indicated by the arrows.

Figure 3 is a detail plan view particularly showing one of the centering lugs at the bottom of the hub slots.

Figure 4 is a detail sectional view showing the inner terminal of one of the spokes and the wedges therein, before the swaging of said terminal.

Figure 5 is a detail sectional view on the line 5—5 of Figure 1, showing the inner terminal of one of the spokes after the swaging thereof.

Figure 6 is a detail perspective view showing a pair of the spoke wedges.

Referring now more particularly to the drawings, the wheel hub is indicated at 9. This hub is provided internally with a medial reinforcing rib 10 and radiating from the hub are spokes 11 surrounded by a channel-shaped felly 12, the side walls of which are, as particularly shown in Figure 2, provided with flanges 13 and 14 to removably accommodate a rim as conventionally illustrated in dotted lines at 15.

Formed in the hub 9 is a plurality of radial slots 16 and between said slots the hub is provided at opposite sides thereof with recesses 17 for reducing the weight of the hub. The slots 16 are formed with confronting convex side walls 18 of like radius so that the slots are thus gradually widened toward the side faces of the hub, and rising from the bottom walls of the slots are rectangular centering lugs 19 tapered toward their free ends. As shown in Figure 3, the centering lugs extend throughout the major portion of the width of the slots and formed on the hub at the outer ends of the slots are pairs of upstanding lips 20.

As shown in Figure 2, the spokes 11 are of tubular construction and these spokes are shaped at their inner ends to form squared terminals 21 which are freely insertable in the slots 16 of the hub and engage over the centering lugs 19. As brought out in Figure 4, the terminals 21 are initially wider than the hub and inserted in each of said terminals is a pair of mating wedges 22. A typical pair of these wedges is shown in detail in Figure 6.

After the terminals 21 of the spokes have been inserted in the slots 16 of the hub, the side edges of said terminals are pressed for swaging the terminals in said slots. As shown in Figure 5, this swaging operation serves to spread the side edges of the terminals while the wedges 22 are advanced against each other. Accordingly, the studs 19 and wedges 22 will prevent the collapsing of the terminals, such as would occur in the absence of said studs and wedges, while the wedges will also serve to expand the terminals against the side walls 18 of the slots. As shown in Figure 1, the wedges are disposed near the outer ends of the spoke terminals in spaced relation to the studs 19 and do not extend the full length of the hub slots. Accordingly, after the terminals are swaged, said terminals are rigidly secured at the studs 19 and at the wedges 22. In other words, each of said terminals is rigidly secured at longitudinally spaced points. The hub castings of different wheels are unavoidably irregular and if the wedges filled all the space between the studs 19 and the outer ends of the spoke terminals, the terminals might swage tight at points between the ends thereof only, or at the middle. The swaging of the terminals is continued until the side edges of the terminals lie flush with the side edges of the spokes and, as will be observed, the wedges as well as the terminals are mutilated so that the side walls of the terminals are flexed to conform to the curvature of said side walls of the slots, seating flat thereagainst Thus, at the side margins of the spoke terminals, wedge-shaped portions 23 are formed to coact with the side walls of the hub slots for locking the spoke terminals against transverse movement and rigidly connecting the terminals with the hub. The lugs 19 are provided for centering the spokes within the slots as well as maintaining the side walls of the terminals, at their inner ends, tight against the side walls of the hub slots, while, after said terminals have been swaged, the lugs will further serve to rigidly brace the spoke terminals at their inner ends. As shown in Figure 1, the lips 20 of the hub seat flat against the spoke terminals at their outer ends for bracing and supporting the spokes adjacent the hub and by widening the slots 16 of the hub toward the side faces of the hub, cavities are formed to accommodate the wedge-shaped portions 23 of the terminals so that it is thus possible, without fracturing the hub, to compress or swage the side edges of the terminals into said cavities flush with the side faces of the hub to produce neat joints between the spokes and hub. Formed from the bottom wall of the felly 12 are in-struck annular flanges 24 and formed on the outer ends of the spokes 11 are reduced annular tenons 25 snugly fitting in said flanges. The spokes are of such length that said spokes are tightly held between the hub and felly so that rigid joints are thus maintained between the spoke tenons and the felly.

Having thus described the invention, what we claim is:

1. In a metallic vehicle wheel, a hub having slots therein widened toward the side faces of the hub, spokes having hollow expanded inner ends in said slots, and an expanded filler in the inner end of each spoke.

2. In a metallic vehicle wheel, a hub having slots therein widened toward the side faces of the hub, spokes having hollow expanded inner ends in said slots, and an expanded filler in the inner end of each spoke, the filler comprising companion filler members having contacting diagonal faces.

In testimony whereof we affix our signatures.

EDWIN W. KEMOE. [L. S.]
WILLIAM G. PRICE. [L. S.]